US012785274B2

(12) United States Patent
Himath et al.

(10) Patent No.: US 12,785,274 B2
(45) Date of Patent: Nov. 3, 2026

(54) DUAL-POLARIZED RADIATION UNIT FOR ANTENNA, ANTENNA, AND ANTENNA SYSTEM

(71) Applicants: PROSE TECHNOLOGIES (SUZHOU) CO., LTD., Suzhou (CN); PROSE TECHNOLOGIES LLC, Mount Olive, NJ (US)

(72) Inventors: Priyananda Himath, Northmead (AU); Zhonghao Hu, Suzhou (CN); Devasia Joseph, Northmead (AU); Darmawirya Daniel, Northmead (AU)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 130 days.

(21) Appl. No.: 18/431,071

(22) Filed: Feb. 2, 2024

(65) Prior Publication Data

US 2024/0178564 A1 May 30, 2024

Related U.S. Application Data

(63) Continuation of application No. PCT/CN2022/077196, filed on Feb. 22, 2022.

(30) Foreign Application Priority Data

Aug. 2, 2021 (CN) ......................... 202110880669.4

(51) Int. Cl.

*H01Q 5/48* (2015.01)
*H01Q 1/24* (2006.01)

(Continued)

(52) U.S. Cl.

CPC ............... *H01Q 5/48* (2015.01); *H01Q 1/246* (2013.01); *H01Q 5/42* (2015.01); *H01Q 9/285* (2013.01);

(Continued)

(58) Field of Classification Search

CPC ............ H01Q 1/246; H01Q 1/38; H01Q 1/52; H01Q 1/521; H01Q 1/523; H01Q 5/42;

(Continued)

(56) References Cited

U.S. PATENT DOCUMENTS 11,437,722 B2 * 9/2022 Wu ........................ H01Q 5/314
2007/0241983 A1 10/2007 Cao et al.

(Continued)

FOREIGN PATENT DOCUMENTS

CN 1591976 A 3/2005
CN 202333122 U 7/2012

(Continued)

OTHER PUBLICATIONS

World Intellectual Property Organization (WIPO) International Search Report for PCT/CN2022/077196 May 16, 2022 5 pages (with translation).
The European Patent Office (EPO) Extended Search Report for EP Application No. 22851556.5 Jun. 11, 2025 12 Pages.

*Primary Examiner* — Robert Karacsony
(74) *Attorney, Agent, or Firm* — ANOVA LAW GROUP, PLLC

(57) ABSTRACT

A dual-polarized radiation unit for an antenna includes: four dipoles, wherein radiation arms of the four dipoles are configured in relation to two mutually perpendicular lines, wherein the two mutually perpendicular lines divide the radiation unit into four regions, and a center portion of the four regions is direct current-conducting, and wherein each of the four regions has a hollow region.

17 Claims, 10 Drawing Sheets

(51) Int. Cl.

| | |
|---|---|
| ***H01Q 5/42*** | (2015.01) |
| ***H01Q 9/28*** | (2006.01) |
| ***H01Q 21/06*** | (2006.01) |
| ***H01Q 21/24*** | (2006.01) |
| ***H01Q 25/00*** | (2006.01) |

(52) U.S. Cl.
CPC ........... *H01Q 21/062* (2013.01); *H01Q 21/24* (2013.01); *H01Q 25/001* (2013.01)

(58) Field of Classification Search
CPC ............ H01Q 5/48; H01Q 9/28; H01Q 9/285; H01Q 19/108; H01Q 21/062; H01Q 21/20; H01Q 21/24; H01Q 21/26; H01Q 21/28; H01Q 25/00; H01Q 25/001
See application file for complete search history.

(56) References Cited

U.S. PATENT DOCUMENTS

| | | | | |
|---|---|---|---|---|
| 2018/0097293 | A1 | 4/2018 | Piegsa et al. | |
| 2021/0226344 | A1 * | 7/2021 | Wu ...................... | H01Q 21/065 |

FOREIGN PATENT DOCUMENTS

| | | | |
|---|---|---|---|
| CN | 109244652 | A | 1/2019 |
| CN | 111180870 | A | 5/2020 |
| CN | 113140893 | A | 7/2021 |
| EP | 1475860 | A1 | 11/2004 |
| FR | 2841390 | B1 | 9/2004 |
| WO | 2018036009 | A1 | 3/2018 |

* cited by examiner

DUAL-POLARIZED RADIATION UNIT FOR ANTENNA, ANTENNA, AND ANTENNA SYSTEM

RELATED APPLICATION(S)

This application is a continuation application of PCT Patent Application No. PCT/CN2022/077196, filed on Feb. 22, 2022, which claims priority to Chinese Patent Application No. CN202110880669.4 filed with the National Intellectual Property Administration, People's Republic of China on Aug. 2, 2021, all of which are incorporated herein by reference in entirety.

FIELD OF THE TECHNOLOGY

The present disclosure relates to a technical field of radio frequency communication, in particular to a dual-polarized radiation unit for an antenna, an antenna including the dual-polarization radiation unit for an antenna, and an antenna system including the antenna.

BACKGROUND

In the broad-spectrum range between 400 MHz and 6 GHz, the so-called sub-6 GHZ band range, these spectrum ranges are allotted to telecommunications for communication. However, it remains technically challenging to design analog components such as filters, phase shifters, radiation units, and amplifiers for such a wide bandwidth. The sub-6 GHZ band range is often divided into multiple sub-bands and operated separately to enable the design of analog components. For example, the frequency band below 6 GHz is often divided into four separate working sub-bands: 600 MHz to 1 GHz, 1.4 GHz to 3 GHZ, 3 GHz to 4.2 GHz, and 5 GHz-6 GHz. Base station antennas for LTE, 5G or 3G communications often include arrays of multiple radiation units operating in different frequency bands.

These separated frequency bands often require separate components such as filters, phase shifters, amplifiers, radiation units. Many of these components better not interfere with each other, a minimum isolation may be around 20 dB, and an isolation between each signal channel may be 30 dB. This is relatively easy to achieve for shielded channels such as filters, phase shifters, or the like, where most if not all signals are shielded by microstrips or strip lines. However, it is relatively difficult to isolate the radiation units because they radiate into the air and couple very easily. If this level of isolation is achieved, pattern distortion and port-to-port isolation issues may arise. These problems degrade network performance. If the radiation units may be separated by more than two wavelengths at a lowest frequency, the isolation may be enhanced, but such a separation distance reduces the integration of the antenna system and increases the volume of the antenna system.

Space for antennas on cell towers is often limited, because multiple frequency bands, operators and sectors are to be covered. Over the past five to seven years, the industry has been moving towards combining multiple sub-band systems into a same radome or product, making isolation a challenge.

SUMMARY

As mentioned herein, interference occurs between certain existing radiation units of different frequency bands. Due to the existence of interference between low-frequency radiation unit and high-frequency radiation unit, there is a fixed positional relationship between the low-frequency radiation unit and the high-frequency radiation unit, which makes decoupling more difficult, thus limiting the design of the multi-frequency radiation unit.

In one aspect, the present disclosure provides a dual-polarized radiation unit for antenna, where the dual-polarized radiation unit of an antenna includes: four dipoles, wherein radiation arms of the four dipoles are configured in relation to two mutually perpendicular lines, wherein the two mutually perpendicular lines divide the radiation unit into four regions, and a center portion of the four regions is direct current-conducting, and wherein each of the four regions has a hollow region.

The dual-polarized radiation unit according to certain embodiment(s) of the present disclosure has a hollow region, such that its interference towards the electromagnetic wave generated by the radiation unit of other frequency bands is reduced. The dual-polarized radiation unit according to certain embodiment(s) of the present disclosure is more friendly to system integration, and the radiation performance of the integrated multi-band radiation unit is improved. In certain embodiment(s), a center portion of the dual-polarized radiation unit according to the present disclosure conducts direct current, its manufacturing process is simpler and more convenient. In certain embodiment(s), and the dual-polarized radiation unit according to the present disclosure is an integrated structure, such that its product consistency is higher and its radiation performance is better ensured.

In certain embodiment(s), the two mutually perpendicular lines are a first line and a second line, and wherein a first side of the dual-polarized radiation unit is perpendicular to the first line of the two mutually perpendicular lines, wherein the first side intersects the first line. In certain existing designs of dual-polarized radiation unit, the two mutually perpendicular lines of those existing designs are usually diagonal lines, that is to say, the edge of the dual-polarized radiation unit to which the diagonal extends, in those existing designs, is usually a corner of the dual-polarized radiation unit, not a side, and not a side with a visible length. The edge of the dual-polarized radiation unit, according to certain embodiment(s) of the present disclosure, to which the two mutually perpendicular lines of the dual-polarized radiation unit extend is a side of the dual-polarization radiation unit. In certain embodiment(s), the side is perpendicular to a corresponding line of the two mutually perpendicular lines. The dual-polarized radiation unit according to certain embodiment(s) of the present disclosure adopts a corner cutting method, so that area of the dual-polarized radiation unit according to certain embodiment(s) of the present disclosure is relatively smaller, thereby saving material and further reducing the manufacturing cost. In certain embodiment(s), the dual-polarized radiation unit is of an octagonal shape. Compared with a dual-polarized radiation unit having a quadrilateral shape, the dual-polarized radiation unit according to certain embodiment(s) of the present disclosure adopts a corner cutting method, so that the dual-polarized radiation unit according to certain embodiment(s) of the present disclosure, for example, has an octagonal shape. Compared to certain existing designs, the area of the due-polarized radiation unit according to certain embodiment(s) of the present disclosure is relatively smaller, thereby saving more materials, thereby reducing manufacturing costs.

In certain embodiment(s), the dual-polarized radiation unit includes four grooves, and the four grooves are respectively located at an adjoining portion of two adjacent regions of the four regions. In certain embodiment(s), two of the four grooves point to a polarization direction, for example, a +45° polarization direction, while the other two grooves point to another polarization direction, for example −45° polarization direction. Although a size of the groove, such as a length of the groove, is reduced by cutting corners as aforementioned, the resonant frequency of the electric current loop may be moved even higher until the resonance exceeds a working range of the antenna, thereby reducing the impact of other frequency bands on the dual-polarized radiation unit according to certain embodiment(s) of the present disclosure.

In certain embodiment(s), the dual-polarized radiation unit further includes: four feed lines, wherein the four feed lines respectively correspond to the four grooves, and a length of any one of the four feed lines corresponds to an impedance.

In certain embodiment(s), the dual-polarized radiation unit further includes: a common-mode choke circuit. In certain embodiment(s), the common-mode choke circuit includes a first track and a second track, and wherein electrical lengths of the first track and the second track are the same.

In certain embodiment(s), the dual-polarized radiation unit further includes a shunt filter. In certain particular embodiment(s), the shunt filter is configured as a metallic wire extending inwardly from an edge of the hollow region towards the hollow region. In certain particular embodiment (s), the shunt filter is configured as an open circuit line.

In certain embodiment(s), the dual-polarized radiation unit further includes: an inductance part extending from an edge of the hollow region away from the center portion of the dual-polarized radiation unit towards the center portion.

In a second aspect, the present disclosure provides an antenna, the antenna including at least one dual-polarized radiation unit according to the first aspect of the present disclosure.

In a third aspect, the present disclosure provides an antenna system, the antenna system including: a first antenna according to the second aspect of the present disclosure; and at least one second antenna, wherein a working frequency band of the at least one second antenna is higher than a working frequency band of the first antenna.

In certain embodiment(s), the first antennas and the second antennas partially overlap to each other. In certain embodiment(s), a number of columns of the first antenna is same to a number of columns of the second antenna.

The dual-polarized radiation unit according to certain embodiment(s) of the present disclosure has a hollow region, such that its interference towards the electromagnetic wave generated by the radiation unit of other frequency bands is reduced. The dual-polarized radiation unit according to certain embodiment(s) of the present disclosure is more friendly to system integration, and the radiation performance of the integrated multi-band radiation unit is improved. In certain embodiment(s), a center portion of the dual-polarized radiation unit according to the present disclosure is conducted with direct current, its manufacturing process is simpler and more convenient. In certain embodiment(s), and the dual-polarized radiation unit according to the present disclosure is an integrated structure, such that its product consistency is higher and its radiation performance is better ensured.

BRIEF DESCRIPTION OF THE DRAWINGS

Features, advantages, and other aspects of various embodiments of the present disclosure become more apparent with reference to the following detailed description, taken in conjunction with the accompanying drawings, which are presented here by way of illustration and not limitation, in the drawings.

DETAILED DESCRIPTION

Certain embodiments of the present disclosure are described in detail below with reference to the accompanying drawings. While the example methods and apparatus described below may include software and/or firmware executing on hardware, among other components, these examples are illustrative only and should not be viewed as limiting. For example, any or all hardware, software, and firmware components may be implemented exclusively in hardware, exclusively in software, or in any combination of hardware and software. Therefore, although exemplary methods and apparatuses are described below, those examples provided are not intended to limit the manner in which these methods and apparatuses are implemented.

Flowchart and block diagrams in the figures illustrate the architecture, functionality, and operation of possible implementations of methods and systems according to certain embodiments of the present disclosure. It should be noted that the functions noted in the blocks of a block diagram may also occur out of the order noted in the figures. For example, two blocks shown in succession may, in fact, be executed substantially concurrently, or they may sometimes be executed in a reverse order, depending upon the functionality involved. When applicable, any block in the flowchart and/or block diagrams, and combinations of blocks in the flowchart and/or block diagrams, may be implemented using a dedicated hardware-based system that performs certain defined functions or operations, or may be implemented using a combination of dedicated hardware and computer instructions.

As mentioned herein, the following technical problem exists in certain existing technology, that is, interference is formed between existing radiation units of different frequency bands. In certain embodiment(s), the present disclosure provides a dual-polarized low-band radiation unit operating below 1 GHz, that works well even when two or three different units overlap to a large extent (heights in different dimensions), to generate good isolation again interference from other high-frequency bands (such as sub-bands 2, 3, 4 mentioned above), such that the high-frequency pattern remains the same as if there were no low-frequency units on top. In addition, the impact on the performance of the low-frequency unit itself, such as radiation pattern and return loss, is minimized.

Figure 1A:
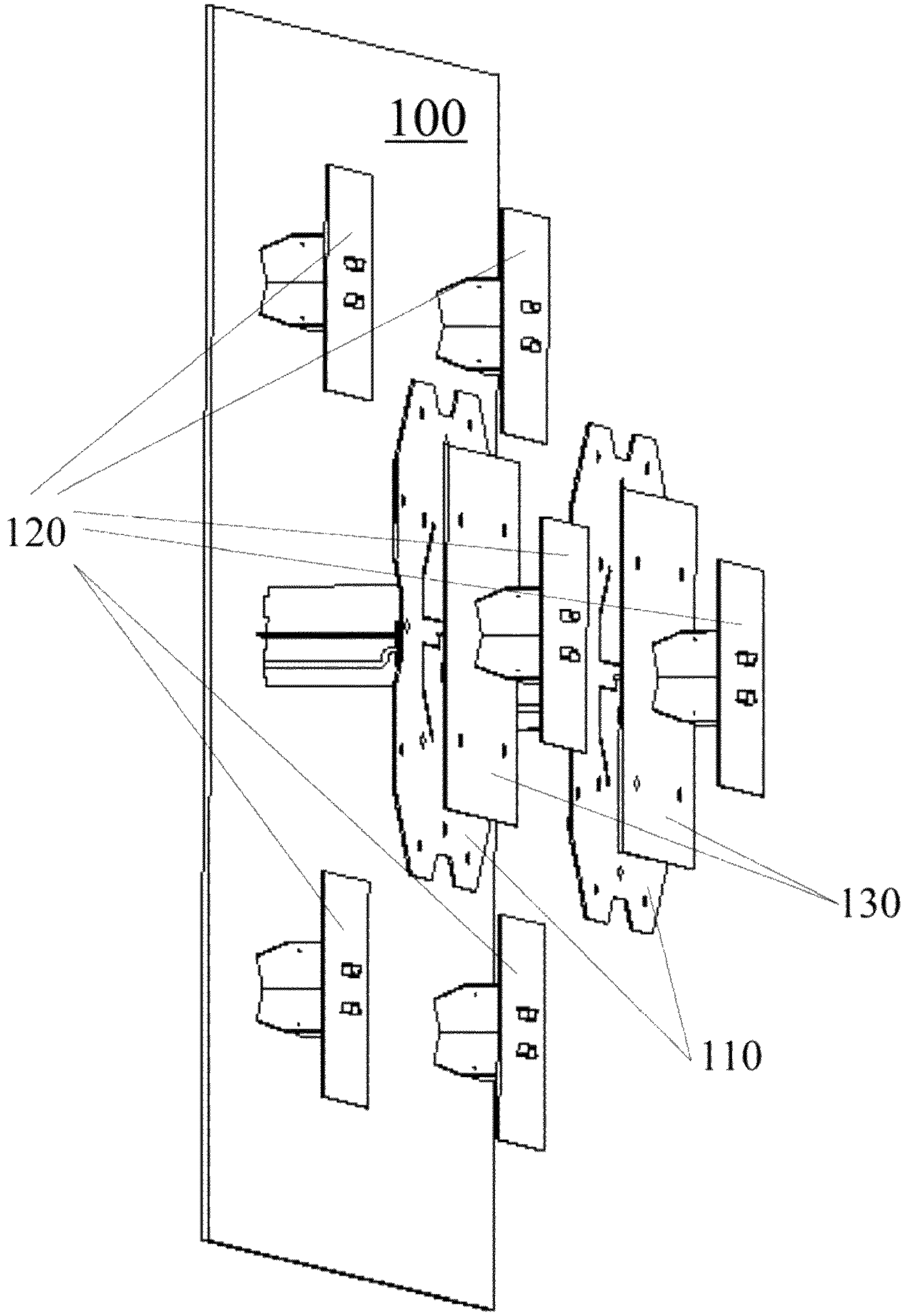
FIG. 1A (Prior Art)
FIG. 1A is a schematic perspective view of an antenna system 100 including a dual-polarized radiation unit 110 and a high-frequency radiation unit 120 in certain existing art.
Figure 1B:
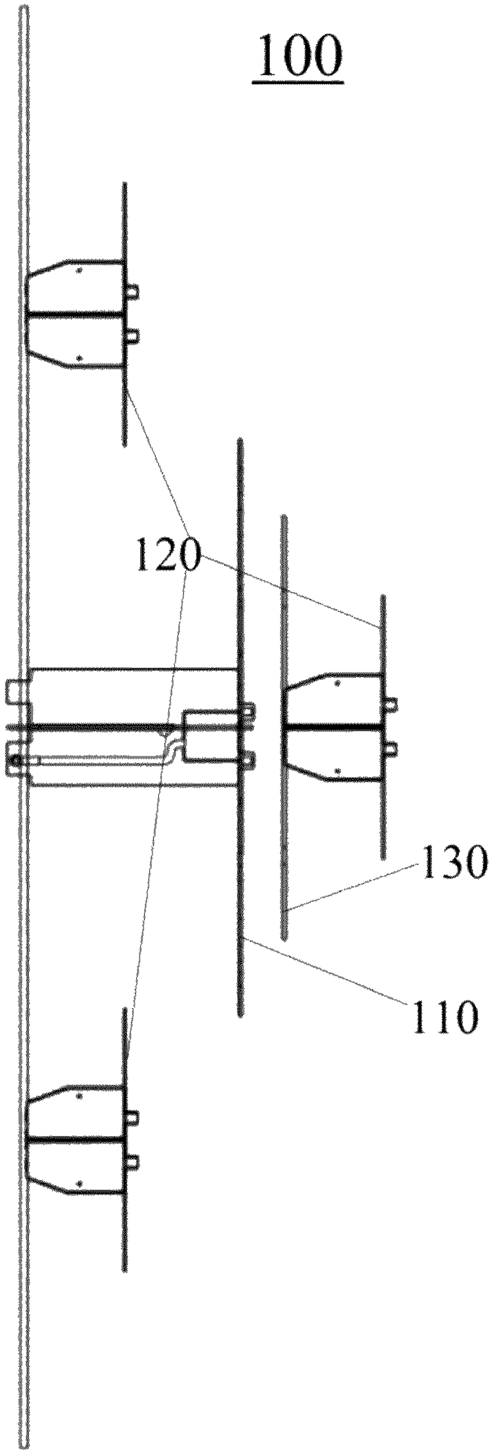
FIG. 1B (Prior Art)
FIG. 1B is a schematic side view of an antenna system 100 including a dual-polarized radiation unit 110 and a high-frequency radiation unit 120 in certain existing art.

WO2015/124573A discloses a radiation unit. FIG. 1A of WO2015/124573A is a schematic perspective view of an antenna system 100 including a dual-polarized radiation unit 110 and a high-frequency radiation unit 120, and FIG. 1B of WO2015/124573A is a schematic side view of an antenna system 100 including a dual-polarization radiation unit 110 and a high-frequency radiation unit 120. According to FIG. 1A and FIG. 1B of WO2015/124573A, the antenna system 100 disclosed in WO2015/124573A outlines a low-frequency band radiation unit 110 constructed using a four-slot feeding method. WO2015/124573A outlines a method of obtaining a multi-band antenna system 100, by placing the high-frequency radiation unit 120 on top of the low-frequency unit 110 and using a metal sheet 130 as a reflector for the high-frequency unit 120. In this way, the high-frequency band array 120 is in line with the low-frequency band array 110, where half of the high-frequency units 120 are positioned on top of the low-frequency units 110, and the other half of the high-frequency units 120 are positioned between the low-frequency units 110. In a way of designing the radiation unit 110 and the radiation unit 120 of the antenna system 100, WO2015/124573A did not try to make the low-frequency radiation unit 110 invisible to the high-frequency radiation unit 120, but merely to make the low-frequency unit 110 arranged to avoid the high-frequency radiation unit 120 from being obscured. However, this method of WO2015/124573A appears to have some disadvantages:

Firstly, the vertical unit spacing of the radiation units 120 of the high-frequency array of WO2015/124573A appears to be limited to half of the spacing of the radiation units 110 of the low-frequency array. The spacing of the radiation units 110 of the low-frequency band array of WO2015/124573A is usually about 0.72, and a reasonable level of grating lobe may be achieved at a large down-tilt angle, where the grating lobe is a side lobe that increases as an angle of a scanning beam increases, is proportional to a ration of the spacing of the radiation units to the wavelength of the radiation units of the array. Larger spacing between radiation units results in higher grating lobes. Grating lobes reduce the gain of the array's radiation units and may not be reduced by adjusting the amplitude or phase taper of the array's radiation units.

Second, due to the wider frequency spectrum at high frequencies in WO2015/124573A, high frequencies become more sensitive to the effects of grating lobes at higher frequencies within the band. Practical spacing between radiation units used in the industry is 0.78λ to 0.85λ. If the spacing between the radiation units of the high-frequency band is half of the spacing between the radiation units of the low-frequency band, according to WO2015/124573A, it is greater than 0.9% of the high frequency, resulting in significant grating lobes. The grating lobe of the radiation unit of the 0.78λ array inclined downward at 10 degrees is about 13.5 dB, and the grating lobe of the radiation unit of the 0.91λ array inclined downward at 10 degrees is about 7.5 dB.

The present disclosure in certain embodiment(s) provides a method for improving the grating lobes of the radiation units of the high-frequency band, that is, allowing the spacing between the radiation units of the high-band array to be liberalized (usually less than 0.7 wavelengths). In certain embodiment(s), the radiation units of the high-band array are placed side by side with the radiation units of the low-band array. However, if the radiation units of low-band units are not hidden at high-band frequencies, and when the radiation units of the high-band array are very close to the radiation units of the low-band array, the modes in the high-band may be distorted.

To obtain good high-frequency vertical plane and horizontal plane pattern performance with the radiation units of low-band arrays, the radiation units of high-band arrays are placed side by side with the radiation units of low-band arrays, and are kept at a greater distance from the radiation units of low-band arrays. This arrange may limit the possibility of having multiple radiation units of the high-band array and radiation units of the low-band array in a narrow-width antenna.

In certain embodiment(s) of the present disclosure, the radiation units of the low-band array are invisible to the high-band frequencies, which provides flexibility for the interleaved arrangement between the radiation units of the high-band array and the radiation units of the low-band array. In certain embodiment(s), there is no restriction or reduced restriction on the spacing between the radiation units of the high-band array, which provides enhanced freedom for obtaining optimal grating lobe and gain performance.

Figure 2A:
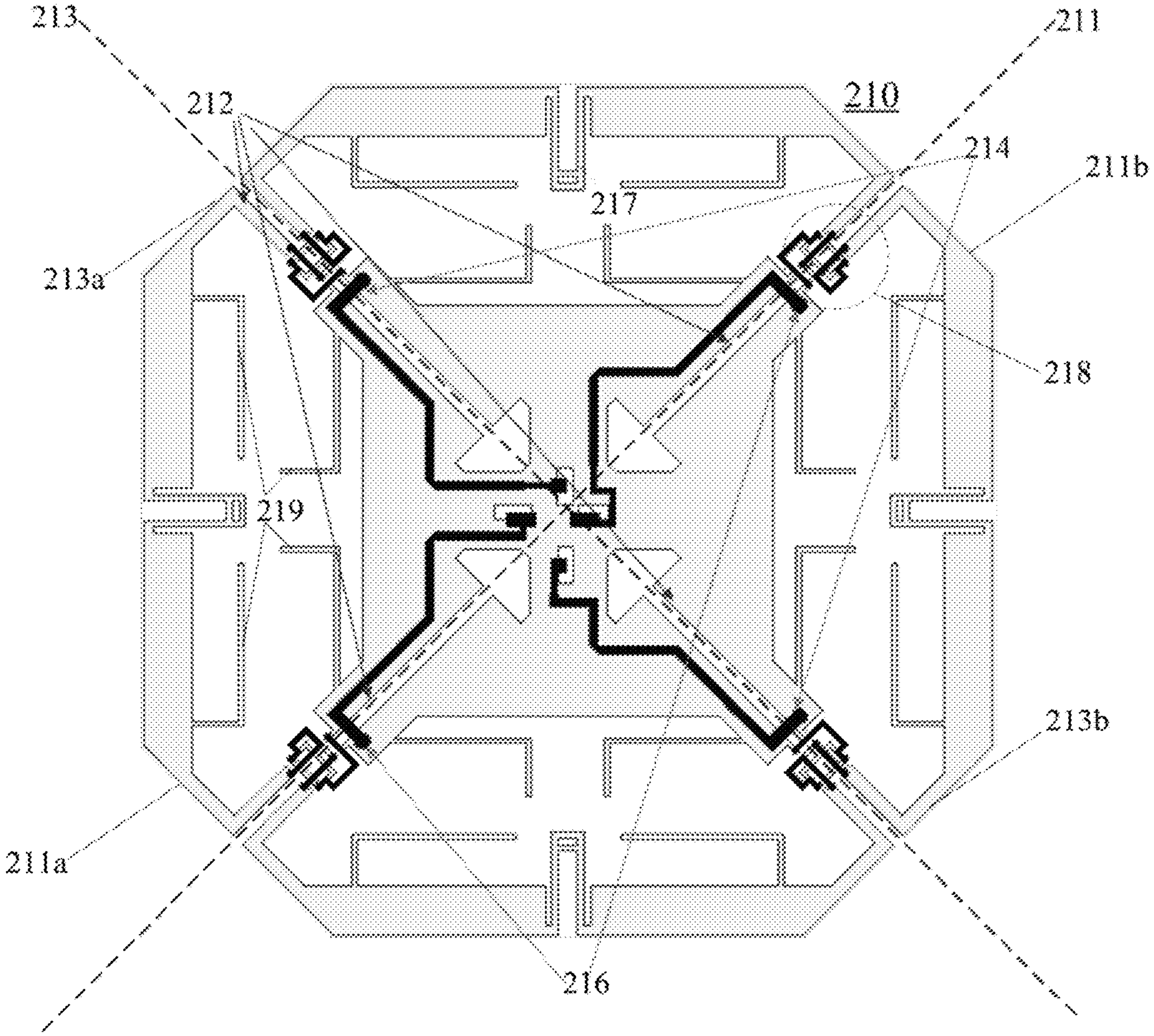
FIG. 2A is a schematic diagram of a dual-polarized radiation unit 210 for an antenna according to certain embodiment(s) of the present disclosure.
Figure 2B:
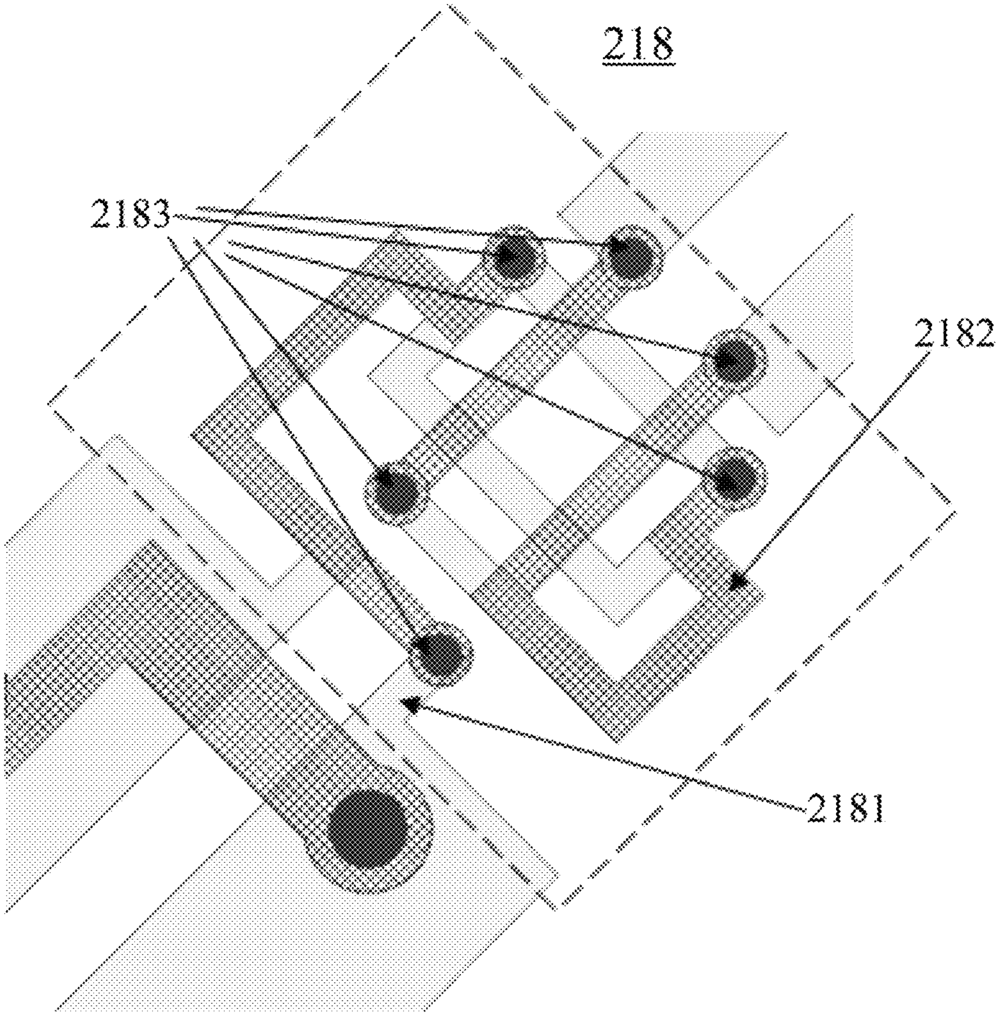
FIG. 2B is a partially enlarged schematic diagram of a common-mode choke circuit for a dual-polarized radiation unit 210 of an antenna according to certain embodiment(s) of the present disclosure.
Figure 2C:
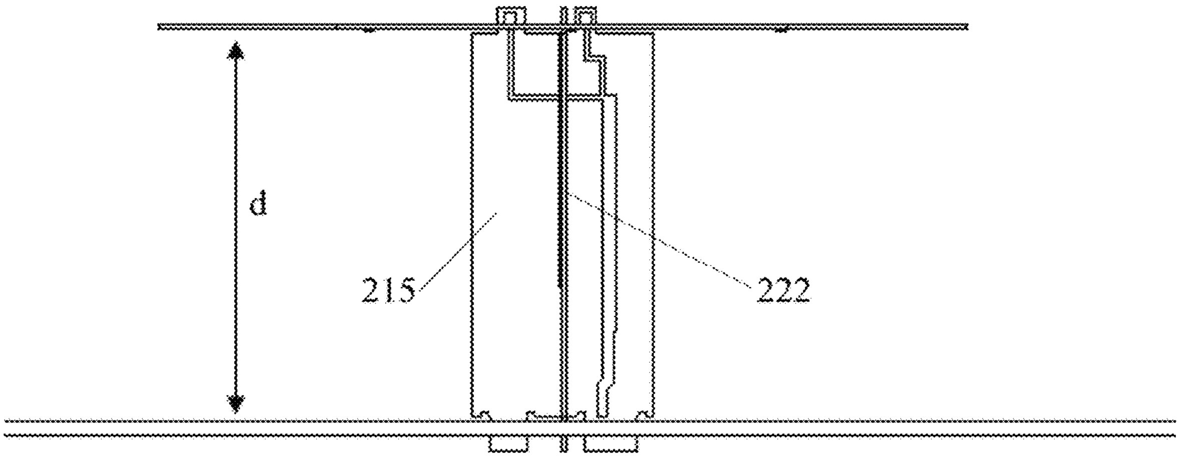
FIG. 2C is a schematic side view of a dual-polarized radiation unit 210 for an antenna according to certain embodiment(s) of the present disclosure.

A dual-polarized radiation unit 210 proposed according to certain embodiment(s) the present disclosure is introduced below in conjunction with FIG. 2A and FIG. 2B, where FIG. 2A shows a schematic diagram of the dual-polarized radiation unit 210 for antenna according to certain embodiment(s) of the present disclosure, FIG. 2B shows a partially enlarged schematic diagram of a common-mode choke circuit of the dual-polarized radiation unit 210 for an antenna according to certain embodiment(s) of the present disclosure, and FIG. 2C shows a schematic diagram of a side view of the dual-polarized radiation unit 210 for an antenna according to certain embodiment(s) of the present disclosure. It can be seen from FIG. 2A that the dual-polarized radiation unit 210 for an antenna proposed according to the present disclosure includes four dipoles, that is, a pair of dipoles is formed by a diagonal line in FIG. 2A, for example, two poles at each end of diagonal 211 form a dipole, two dipoles at each end of the diagonal 211 form a pair of dipoles, two poles at each end of diagonal 213 form a dipole, two dipoles at each end of the diagonal 213 form a pair of dipoles. In other words, the four dipoles jointly form two pairs of dipoles along the two diagonals 211 and 213. In certain embodiment(s), the two diagonals 211 and 213 are mutually perpendicular to each other. In certain embodiment(s), the radiation arms of the four dipoles (that is, the outward gray region) is a planar structure and is axisymmetric about the diagonals 211 and 213, where, the diagonals 211 and 213 divide the dual-polarized radiation unit 210 into four regions, and central portions of the four regions are connected with direct current, that is, regions of the four areas that intersect diagonals 211 and 213 are DC (direct current) conductive, rather than hollow and disconnected, and where each of the four regions has a hollow region. That is, each region formed by dividing the dual-polarized radiation unit 210 by the two diagonals 211 and 213 has a blank hollow region as shown in the figure(s). Since the dual-polarized radiation unit 210 is provided with the hollow region, high-frequency signals are allowed to pass through, so that the dual-polarized radiation unit 210 imparts less shielding against high-frequency oscillators and minimizes diffraction. In other words, the dual-polarized (for example, +45°, −45°) radiation unit 210 operating at a low-frequency band (sub-band 1) is designed to be invisible to high-frequency radiation units working at high-frequency band (sub-bands 2, 3, or 4). The dual-polarized radiation unit 210 inherently has good radiation performance at the return loss bandwidth over sub-band 1. In certain embodiment(s), the dual-polarized radiation unit 210 may be realized by PCB (printed circuit board), and it may also be formed by using a metal plate or a die-casting plate, because the main body of the low-frequency dual-polarized radiation unit 210 is DC conducting, which means that the dual-polarized radiation unit 210 for working at low-frequency band may be integrally formed by metal casting or sheet metal processing.

In certain embodiment(s), and as schematically shown in FIG. 2, a medium panel is omitted, where, a microstrip transmission line 214 and a microstrip transmission line 216 on one plane are shown, and the plane 223 where the dipole represented by the gray area is located is on another plane. In certain embodiment(s), the medium panel may be referred to as a dielectric board. In certain embodiment(s), the microstrip transmission line 214 is a feed line. In certain embodiment(s), the microstrip transmission line 216 is a feed line. In certain embodiments, the medium panel is configured between the two parallel planes. In certain embodiment(s), the two planes are parallel to each other.

The dual-polarized radiation unit 210 according to certain embodiment(s) of the present disclosure provides a direct-current conduction at its central portion, so its manufacturing process is simpler and more convenient, and the dual-polarized radiation unit 210 according to certain embodiment(s) of the present disclosure may be an integral structure, so its product consistency is better, and its radiation performance may be better ensured. The dual-polarized radiation unit 210 according to certain embodiment(s) of the present disclosure has a hollow region, so that its interference with electromagnetic wave signals generated by radiation units working at other frequency bands is reduced, so that the dual-polarized radiation unit 210 according to certain embodiment(s) of the present disclosure is more friendly to system integration, and the radiation performance of the integrated multi-band radiation unit is improved. In certain embodiment(s), a size of a groove 212 reduces about ¼ of the high-frequency wavelength, for example, by edge chamfering. The groove 212 may also be a slot in certain configurations. In certain embodiment(s), and when the high-frequency-band radiation unit is shadowed by the low-frequency-band radiation unit, such as the dual-polarized radiation unit 210 here, an electric current loop at the high-band frequency is established at the groove 212 and at an edge of the groove 212. By reducing the size of the groove 212, for example, resonant frequency of an electric current loop may be shifted higher until the resonance exceeds an operating range of the antenna. In certain embodiment(s), other features of the geometry may be adjusted to maintain impedance bandwidth (return loss better than 12 dB) at low-band frequencies.

In certain embodiment(s), and as schematically depicted in FIG. 2A, a first side (such as 211*a* or 211*b*) of the dual-polarized radiation unit 210 is at a first angle to, or in certain particular embodiment(s) is perpendicular to, the corresponding line (such as the diagonal 211) of the two mutually perpendicular lines; and a second side (such as 213*a* or 213*b*) of the dual-polarized radiation unit 210 is at a second angle to, or in certain particular embodiment(s) is perpendicular to, the other corresponding line (such as the diagonal 213) of the two mutually perpendicular lines, where, the first side (for example, 211*a* or 211*b*) is a side intersecting the corresponding line (for example, diagonal 211). In certain existing designs such as a dual-polarized radiation unit 110, the two mutually perpendicular lines are usually diagonal lines, that is to say, the edge of the dual-polarized radiation unit 110 to which the diagonal extends is usually a corner of the dual-polarized radiation unit of 110, not a side, and not a side with a visible length. The edge of the dual-polarized radiation unit 210 to which the diagonals 211 and 213 of the dual-polarized radiation unit 210 extend is a side of the dual-polarization radiation unit 210. In certain embodiment(s), the side is perpendicular to a corresponding line of the diagonals 211 and 213. In comparison to dual-polarized radiation unit 110, the dual-polarized radiation unit 210 adopts a corner cutting method, so that area of the dual-polarized radiation unit 210 according to certain embodiment(s) of the present disclosure is smaller than the area of the dual-polarized radiation unit 110, thereby saving material and further reducing the manufacturing cost. In certain embodiment(s), as schematically shown in FIG. 2A, the dual-polarized radiation unit 210 has an octagonal shape.

In certain embodiment(s), the radiation unit 210 includes a conductive plate configured with four grooves 212 on the diagonals 211 and 213. In certain embodiment(s), each groove 212 takes the form of a slot, where the two grooves on the diagonal 213 point to the +45° vector and the two grooves on the diagonal 211 point to the −45° vector, the two polarizations together constitute an intended polarization direction of the dual-polarized radiation unit 210. As shown in FIG. 2A, each groove uses a microstrip transmission line 214 and a corresponding microstrip transmission line 216 to feed in another groove to form a polarization of the antenna. In certain embodiment(s), and as schematically shown in FIG. 2A, when viewed from the top, the feed point connected to the microstrip transmission line 214 produces a +45° polarized radiation, while the feed point connected to the microstrip transmission line 216 produces a −45° polarized radiation. The position of the feed point along the groove 212 determines the impedance of the feed point, and in certain embodiment(s), the impedance of the circuit may be matched to 50 ohms by using an impedance transformation line and a power divider. In certain embodiment(s), the two grooves for each polarization are fed with equal amplitude and phase. The support structure is shown in FIG. 2C. In certain embodiment(s), the design is made of 2 intersecting PCBs 215 and 222, each feeding polarization through a power splitter. The output of the power divider is connected to the microstrip line on the radiation unit 210. In certain embodiment(s), the feed structure includes an equal power divider and a section of impedance transformation line, which may be matched to 50 ohms, or 75 ohms, or any other suitable values. These are realized via microstrip circuits, where the back of the feed structure also acts as a balun for the radiation units. It is not necessary to use a PCB for the feed structure and radiation units, alternative versions may be realized using sheet metal or die-cast metal.

In certain embodiment(s), the dual-polarized radiation unit 210 includes four grooves 212, and the four grooves 212 are respectively located at an adjoining portion of two adjacent regions of the four regions. In certain embodiment(s), two of the four grooves 212 (two grooves on the same diagonal) point to a polarization direction, for example, a +45° polarization direction, while the other two grooves (two grooves on the other diagonal) point to another polarization direction, for example −45° polarization direction. Although a size of the groove, such as a length of the groove, is reduced by cutting corners as aforementioned, the resonant frequency of the electric current loop may be moved even higher until the resonance exceeds a working range of the antenna, thereby reducing the impact of other frequency bands on the dual-polarized radiation unit according to certain embodiment(s) of the present disclosure. In certain embodiment(s), the dual-polarized radiating unit 210 includes four microstrip transmission line 214 and 216, the four microstrip transmission lines 214 and 216 are associated with the four grooves 212, and each feed line in the four microstrip transmission lines 214 and 216 extends from a center portion of the dual-polarized radiation unit 210 (for example, the region where the two diagonals 211 and 213 intersect) to the feed point of the groove 212 associated therewith, where the microstrip transmission lines 214 and 216 are corresponding to matching impedances.

In certain embodiment(s), it may also be seen from FIG. 2A that the dual-polarized radiation unit 210 also includes a common-mode choke circuit 218, and the common-mode choke circuit 218 is configured to be arranged near the feeding point and associated with one of the four grooves. In certain embodiment(s), the dual-polarized radiation unit 210 further includes a shunt filter 219. The shunt filter may alternatively be named a parallel filter. In certain embodiment(s), the shunt filter 219 is configured as a metal wire extending inward from an edge of the hollow region. In certain embodiment(s), the shunt filter 219 is constructed as a symmetrical structure. The shunt filter 219 is configured in the hollow region. The shunt filter 219 is connected to the body of the dual-polarized radiation unit 210, generating an impedance disturbance at the connection. The frequency at which impedance disturbance occurs is controlled by an electrical length of the shunt filter 219. In certain embodiment(s), the electrical length is greater than λ/6 and less than or equal to λ/4, and the shunt filter 219 functions as a band-stop filter. The location of the shunt filter 219 is configured to suppress localized high-band currents flowing around the hollow region of the central region. Since the lines of the shunt filter 219 are added to the continuous conductive track, the shunt filter 219 acts as a parallel circuit. In certain embodiment(s), the shunt filter 219 is configured as an open circuit (transmission) line.

In certain embodiment(s), the dual-polarized radiation unit 210 further includes an inductance part 217, and the inductance part 217 extends from an outer edge of the dual-polarized radiation unit 210 towards the center portion. In certain embodiment(s), a high impedance section is configured at the outer edge. Due to the reduced size of the grooves 212 on the diagonal, the resonant frequency of the low-frequency radiation unit (for example, the dual-polarized radiation unit 210) oscillates to a frequency higher than the frequency of the low-frequency band work center as designed. To rebalance the resonant frequency at the low-frequency band, the inductance part 217 is added. Although the diagonal dimension may be smaller than ideal, the employment of the inductance part 217 increases the electrical length of the radiation unit.

In certain embodiment(s), only one shunt filter 219 and one inductance part 217 are marked. In certain embodiment(s), the shunt filter 219 is an open circuit shunt filter. In certain embodiment(s), each hollow region may be provided with an shunt filter 219 and an inductance part 217.

FIG. 2B is a partially enlarged schematic diagram of a common-mode choke circuit 218 of a dual-polarized radiation unit 210 for an antenna according to certain embodiment(s) of the present disclosure. In certain embodiment(s), and as depicted in FIG. 2B, the common-mode choke circuit 218 further includes a first track 2181 and a second track 2182, where in certain particular embodiment(s), the first track 2181 and the second track 2182 are connected to the radiation arms parallelly to each other in a form of an inductance coil, and in certain particular embodiment(s), the coil winding directions of the first track 2181 and the second track 2182 are consistent to each other. Because of being constructed on two opposing sides of the radiation arm, one or more conducting holes on configured in the radiation arm to conduct electricity, where conducting hole 2183 shown in FIG. 2B is a non-limiting example of such conducting holes. In certain embodiment(s), electrical lengths of the first track 2181 and the second track 2182 are equal. A common-mode choke such as common-mode choke circuit 218 is implemented on a balun, as shown in FIG. 2B. High-band frequencies in the 1.4 GHz to 2.7 GHZ range set a common mode at the low-band balun. The low-band currents in this region are differential, so the common-mode choke circuit 218 is used to suppress the high-band currents without adversely affecting the low-band impedance. FIG. 2B shows a close-up of the structure. Two conductive tracks 2181 and 2182 circulate in parallel to each other on the two layers of the PCB. These two tracks act as coupled inductors. When common-mode currents pass through the coupled structure, the magnetic flux generated by each branch adds up, creating a large inductance. The differential currents produce magnetic fluxes that cancel each other out, so the differential mode sees reduced inductance. Thus, the high-frequency band current is effectively choked, while the low-frequency band current allowed to pass is relatively unaffected. In certain embodiment(s), the upper and lower choke coils of the common-mode choke circuit 218 are wound more tightly to increase the common-mode choke effect and differential conduction mechanism. In certain embodiment(s), the length of the common-mode choke circuit 218 is at least ⅛ wavelength of the high frequency. The choke effect is more pronounced at longer lengths.

Figure 2D:
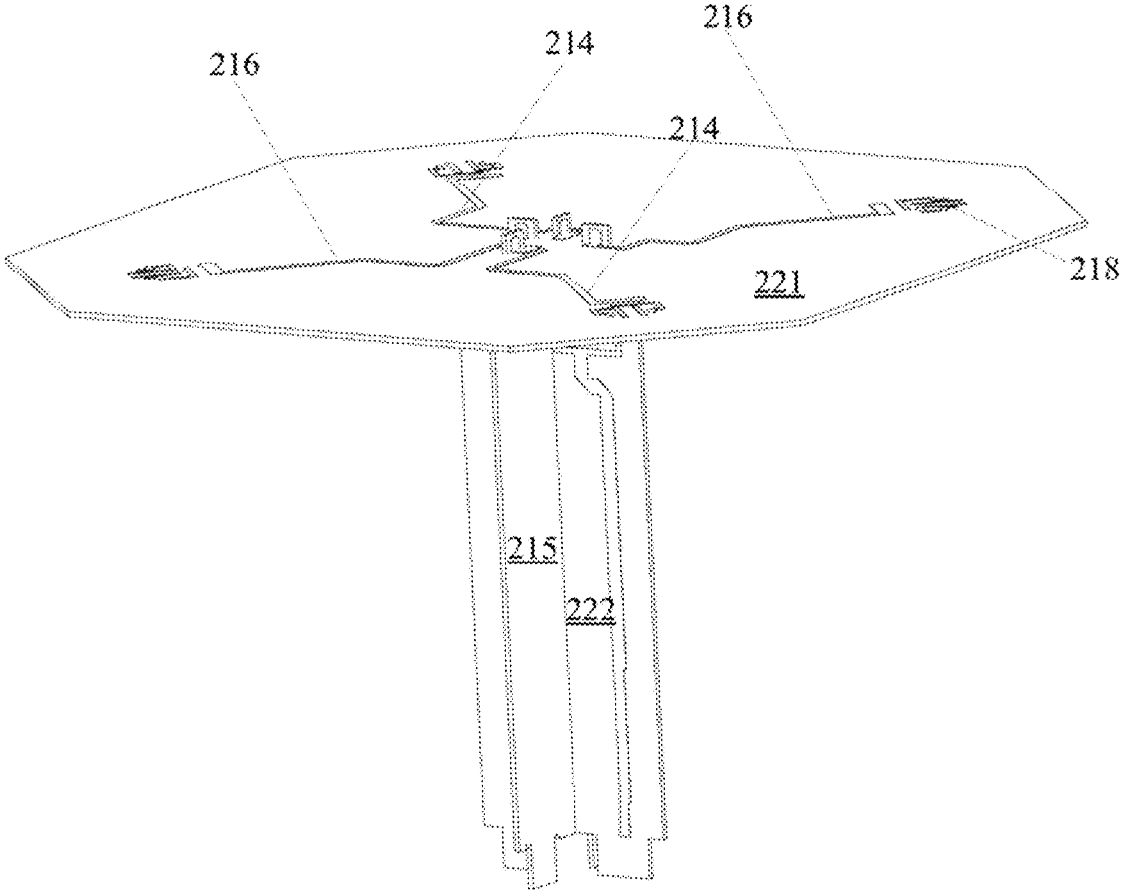
FIG. 2D is a schematic side perspective view of a dual-polarized radiation unit 210 for an antenna according to certain embodiment(s) of the present disclosure.
Figure 2E:
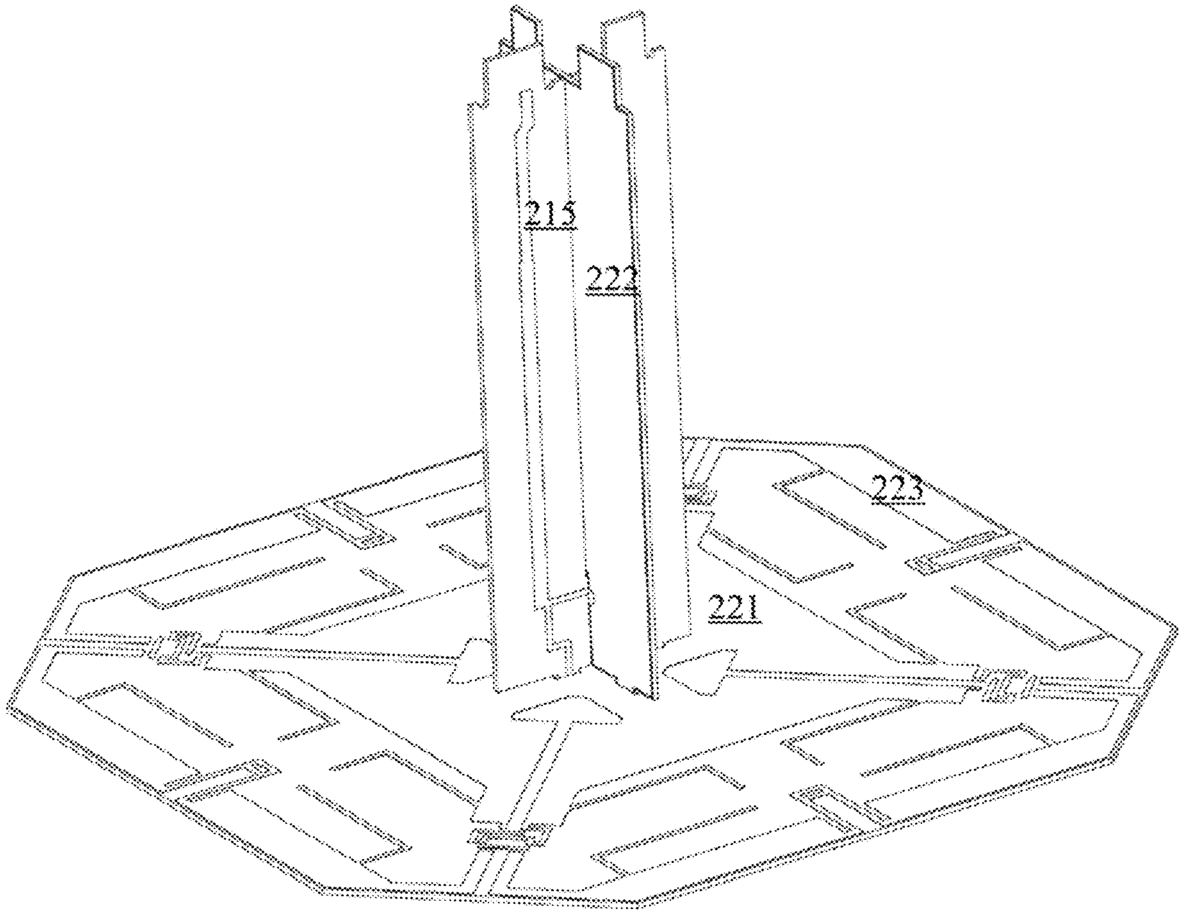
FIG. 2E is a schematic bottom-up perspective view of a dual-polarized radiation unit 210 for an antenna according to certain embodiment(s) of the present disclosure.
Figure 2F:
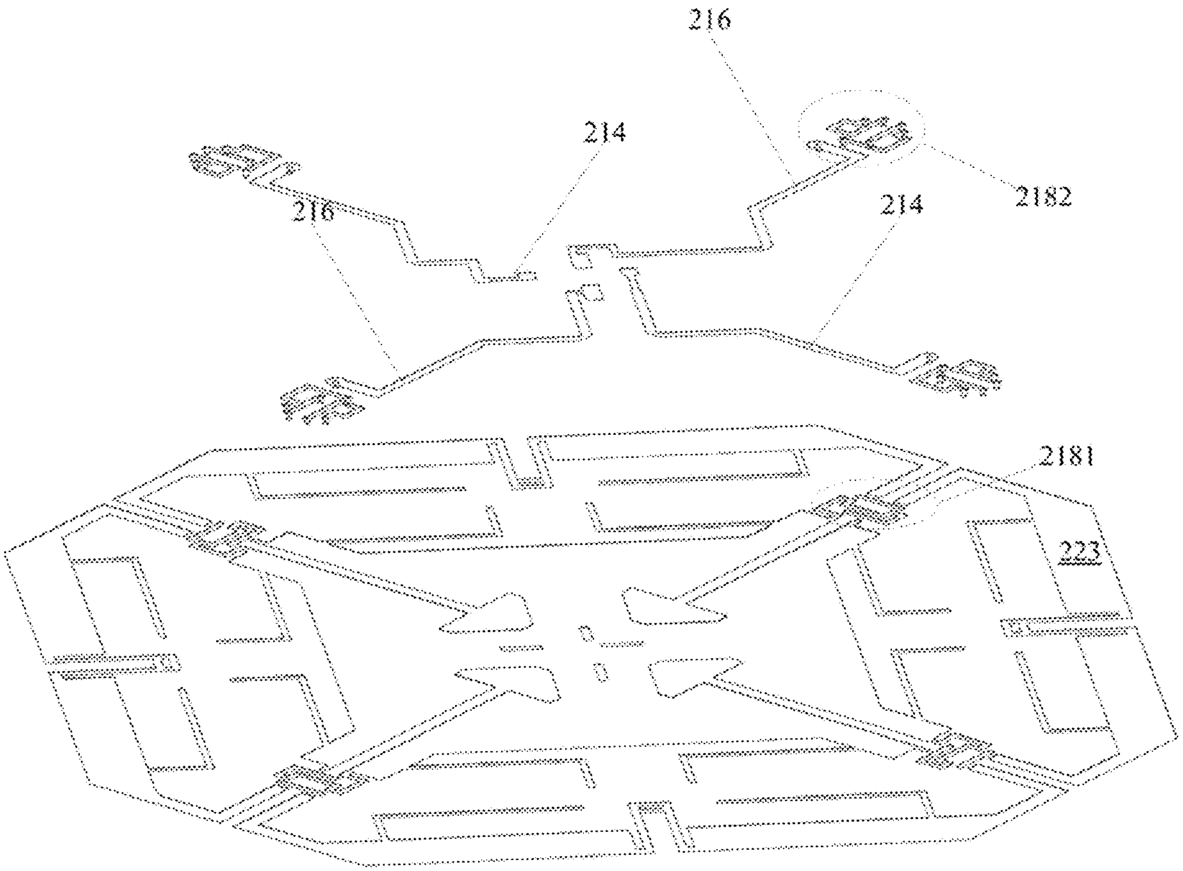
FIG. 2F is a schematic exploded view of a dual-polarized radiation unit 210 for an antenna according to certain embodiment(s) of the present disclosure.

In showing the dual-polarized radiation unit 210, FIG. 2D is a schematic side perspective view of a dual-polarized radiation unit 210 for an antenna according to certain embodiment(s) of the present disclosure, FIG. 2E is a schematic bottom-up perspective view of a dual-polarized radiation unit 210 for an antenna according to certain embodiment(s) of the present disclosure, while FIG. 2F is a schematic exploded view of a dual-polarized radiation unit 210 for an antenna according to certain embodiment(s) of the present disclosure.

In certain embodiment(s), and as schematically depicted in FIG. 2D, the microstrip transmission line 214, the microstrip transmission line 216, and the common-mode choke circuit 218 are configured on one side or first side of the medium panel 221, and the medium panel 221 is supported through two PCB circuit boards 215 and 222 for support. In certain embodiment(s), and as schematically depicted in FIG. 2E, the plane 223 where the dipole is located is positioned on the other side or second side of the medium panel 221. The first side is an opposing side of the second side. In certain embodiment(s), and as schematically depicted in FIG. 2F, the common-mode choke circuit 218 includes a first track 2181 and a second track 2182 configured on two different planes, and in certain particular embodiment(s), the first track 2181 is in plane 223 where the dipole is located, and the second track 2182 is in the plane where the microstrip transmission line 214 and the microstrip transmission line 216 are located. In certain embodiment(s), the two tracks 2181 and 2182 are connected to the radiation arm in the form of an inductance coil. In certain embodiment(s), the coil winding directions of the first track 2181 and the second track 2182 are consistent or the same. In certain embodiment(s), electrical lengths of the first track 2181 and the second track 2182 are equal or same.

In certain embodiment(s), the second aspect of the present disclosure provides an antenna, including at least one dual-polarized radiation unit 210 and a radiation unit matching circuit shown in FIG. 2A, FIG. 2B, or FIG. 2C. Since the dual-polarized radiation unit 210 provided according to certain embodiment(s) of the present disclosure does not have to overlap with radiation units of other frequency bands, the height d of the multi-band antenna system formed by the dual-polarized radiation unit is reduced.

Figure 3:
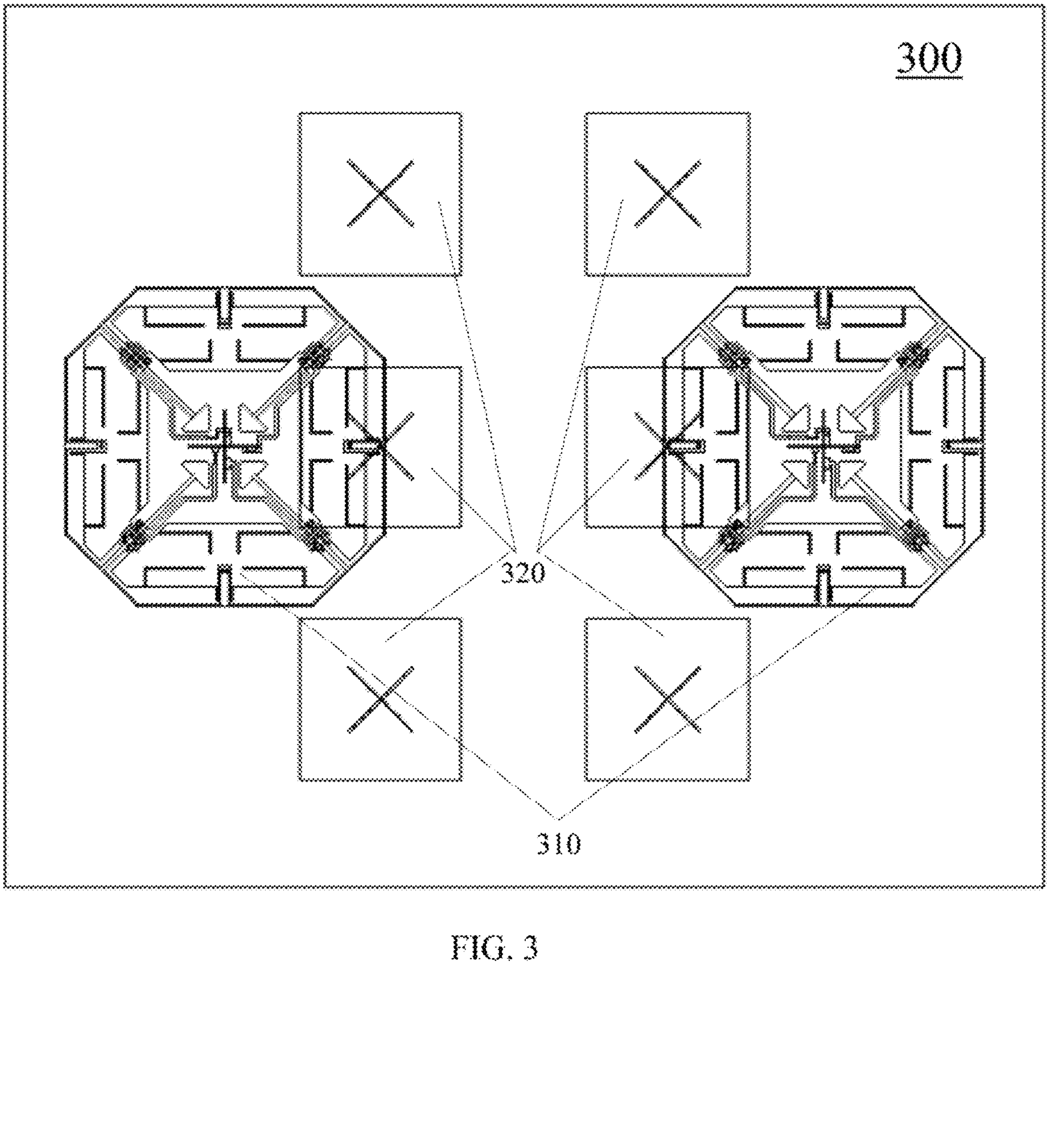
FIG. 3 is a schematic diagram of an antenna system 300 according to certain embodiment(s) of the present disclosure.

The third aspect of the present disclosure provides an antenna system, the antenna system including: the first antenna provided according to the second aspect of the present disclosure; and at least one second antenna, where the operating frequency band of the at least one second antenna is higher than the operating frequency band of the first antenna. In certain embodiment(s), the antennas and the second antennas are of an interleaved arrangement. The antenna system provided according to certain embodiment(s) of the present disclosure is described below in view of FIG. 3. FIG. 3 is a schematic diagram of an antenna system 300 according to certain embodiment(s) of the present disclosure. In certain embodiment(s), and as schematically depicted in FIG. 3, the antenna system 300 includes at least antennas for radiating radio frequency signals of two different frequency bands, where, for example, the first antenna 310 is configured to radiate signals of frequency band 1, that is, the first antenna 310 is configured as a low-frequency antenna; correspondingly, for example, the second antenna 320 is configured to radiate signals in the frequency band 2, the frequency band 3, or the frequency band 4, that is, the second antenna 320 is configured as a high-frequency antenna. In certain embodiment(s), the first antenna 310 and the second antenna 320 are in an interleaved arrangement, that is, for example, a column of first antennas 310 is arranged, then two columns of second antennas 320 are arranged, and then a column of first antennas 310 is arranged, and so on. In certain embodiment(s), the first antenna 310 is a low-frequency antenna. In certain embodiment(s), the second antenna 320 is a high-frequency antenna. In certain embodiment(s), the first antenna 310 at least partially covers the second antenna 320 to reduce the distance between two adjacent columns of second antenna 320.

Figure 4A:
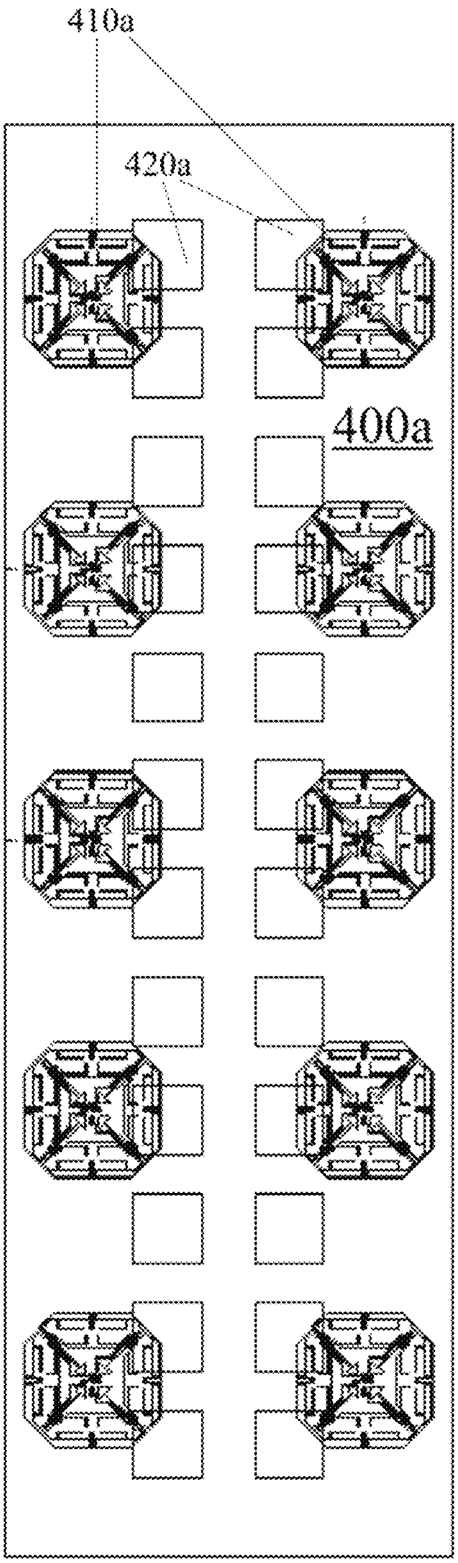
FIG. 4A is a schematic diagram of an antenna system 400*a* according to certain embodiment(s) of the present disclosure.
Figure 4B:
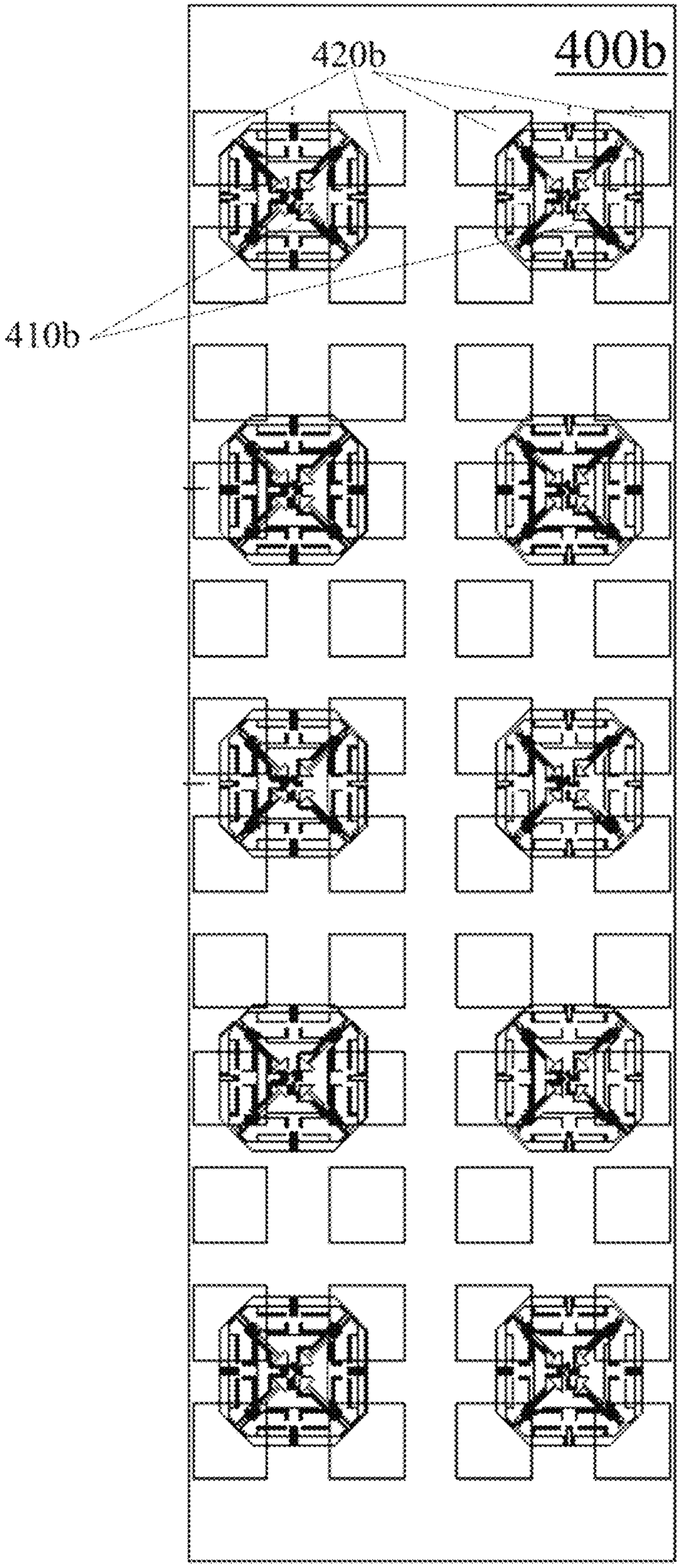
FIG. 4B is a schematic diagram of an antenna system 400*b* according to certain embodiment(s) of the present disclosure.

In certain embodiment(s), the number of columns of the antenna or the first antenna is same to the number of columns of the second antenna, or the number of columns of the second antenna is twice the number of columns of the first antenna. Construction of a multi-band antenna system including the dual-polarized radiation unit 210 according to certain embodiment(s) of the present disclosure is described below with reference to FIGS. 4A and 4B. FIG. 4A is a schematic diagram of an antenna system 400A according to certain embodiment(s) of the present disclosure, and FIG. 4B is a schematic diagram of an antenna system 400B according to certain embodiment(s) of the present disclosure.

In certain embodiment(s), and as schematically depicted in FIG. 4A, the antenna system 400*a* includes two columns of low-frequency antennas 410*a* and two columns of high-frequency antennas 420*a*, that is to say, the number of columns of the low-frequency antennas 410*a* and the number of columns of the high-frequency antennas 420*a* are the same. In certain embodiment(s), and as schematically depicted in FIG. 4B, the antenna system 400*b* includes two columns of low-frequency antennas 410*b* and four columns of high-frequency antennas 420*b*, that is to say, the number of columns of the low-frequency antennas 410*a* and the number of columns of the high-frequency antennas 420*a* are not the same, and in certain particular embodiment(s), the number of columns of the high-frequency antennas 420*b* is twice that of the low-frequency antennas 410*b*. In certain embodiment(s), the low-frequency antenna 410*b* at least partially covers two columns of high-frequency antennas 420*b*, to reduce the distance between two adjacent columns of high-frequency antennas 420*b*.

In the compact multi-band antennas, radiation units of the low-band array and radiation units of the high-band array are often placed close to each other, thereby causing the radiation units of the low-frequency array to partially obstruct the radiation units of the high-band array. When the radiation units of the low-band array are not designed to be transparent enough to the high-band, then the radiation pattern of the high-band may be distorted. Distortion is the result of two mechanisms: diffraction and resonance. Diffraction occurs when an electromagnetic wave interacts with an obstacle causing the electromagnetic wave to twist around the object. Accordingly, when the radiation unit of the low-band array is a continuous piece of metal, a higher degree of diffraction may result. Diffraction that occurs in the near field of the radiation unit may cause distortion of the far field pattern.

When the radiation of the high-frequency band excites the radiation units of the low-frequency band array, the radiation units of the low-frequency band array locally resonate in the high-frequency band. Current is sensitive to the geometry of the local structure in terms of electrical length and impedance. These currents themselves cause unwanted radiation that distorts the high-band far-field pattern.

The radiation unit of the low-band array according to certain embodiment(s) of the present disclosure works to reduce such distortion. To minimize diffraction, the radiation unit of the low-band array has a hollow region in structure to allow the high-band energy to pass through (in certain embodiments, the maximum dimension of the hollow region is larger than ½ wavelength). Compared with the traditional radiation unit, the radiation unit of the low-frequency band according to the present disclosure, for example, four corners of the dual-polarized radiation unit according to the present disclosure is processed by bevel processing, such that shielding of the high-frequency array by the radiation unit of the low-frequency band is further reduced.

To solve the resonance problem, several methods are used. High-impedance points are introduced at certain locations in the low-band radiation unit geometry, thereby suppressing high-band resonances. The high impedance is frequency selective and tuned to retard high frequency band currents without adversely affecting low frequency band currents. The common-mode choke coil is used to suppress the common-mode resonance of the high-frequency band at certain positions of the low-frequency radiation unit. A non-limiting example of such common-mode choke coil is a common-mode filter used on low-frequency oscillators. The common-mode filter includes two inductances tightly wound in a same direction, which creates high reactance at high frequencies, and the resistance of the high reactance is used to reduce the high-frequency resonance generated on the low-frequency oscillator. In certain embodiment(s), the common-mode filter conducts differential low frequency currents. In certain embodiment(s), the filter circuit is ⅛ wavelength longer than the choke frequency. The longer the filter circuit, the more obvious the effect. Another non-limiting example of such common-mode choke coil is a filter formed by a high-frequency ¼ wavelength impedance line connected in parallel on a low-frequency oscillator. The low-frequency oscillator having the characteristics of one or both of the above two filter circuits and having the hollow region reduces the diffraction of the high-frequency oscillator.

The dual-polarized radiation unit 210 according to certain embodiment(s) of the present disclosure has a hollow region, such that its interference towards the electromagnetic wave generated by the radiation unit of other frequency bands (such as the high-frequency radiation unit 220) is reduced. The dual-polarized radiation unit 210 according to certain embodiment(s) of the present disclosure is more friendly to system integration, and the radiation performance of the integrated multi-band radiation unit is improved. In certain embodiment(s), a center portion of the dual-polarized radiation unit 210 according to the present disclosure is conducted with direct current, its manufacturing process is simpler and more convenient. In certain embodiment(s), and the dual-polarized radiation unit 210 according to the present disclosure is an integrated structure, such that its product consistency is higher and its radiation performance is better ensured.

The description herein is only directed to certain embodiments of the present disclosure, and is not intended to limit the scope of the present disclosure, and the present disclosure covers any suitable modifications and changes. Any modifications, equivalent replacements, improvements, and the like, made within the spirit and principle of the present disclosure are included in the protection scope of the present disclosure.

While the present disclosure has been described with reference to several embodiments, the present disclosure is not limited to the embodiments as described. Embodiments of the present disclosure are intended to cover various modifications and equivalent arrangements included within the spirit and scope of the appended claims. The scope of the claims is accorded the broadest interpretation to encompass all such modifications and equivalent structures and functions.

What is claimed is:

1. A dual-polarized radiation unit for an antenna, comprising:

four dipoles, wherein: radiation arms of the four dipoles are configured in relation to two mutually perpendicular lines; and the two mutually perpendicular lines divide the radiation unit into four regions;

four grooves, respectively configured at an adjoining portion of two adjacent regions of the four regions; and four feed lines, wherein the four feed lines respectively correspond to the four grooves, and a length of any one of the four feed lines corresponds to an impedance;

wherein:

a center portion of the dual-polarized radiation unit where the four regions intersect with the two mutually perpendicular lines is direct current (DC) conductive;

each of the four regions has a hollow region;

each of the four feed lines initiates from a middle region of the dual-polarized radiation unit and extends to a feed point of the groove associated therewith; and each of the four feed lines are separately disposed in an associated region of the four regions and are non-intersecting with each other.

2. The dual-polarized radiation unit according to claim 1, wherein the two mutually perpendicular lines are a first line and a second line, and wherein a first side of the dual-polarized radiation unit is perpendicular to the first line of the two mutually perpendicular lines, wherein the first side intersects the first line.

3. The dual-polarization radiation unit according to claim 2, wherein the dual-polarization radiation unit is of an octagonal shape.

4. The dual-polarized radiation unit according to claim 1, further comprising:

a common-mode choke circuit positioned near a feed point and associated with one of the four grooves.

5. The dual-polarized radiation unit according to claim 1, further comprising:

a common-mode choke circuit.

6. The dual-polarized radiation unit according to claim 5, wherein the common-mode choke circuit includes a first track and a second track, and wherein electrical lengths of the first track and the second track are the same.

7. The dual-polarized radiation unit according to claim 6, wherein:

the first track and the second track are configured on both sides of the radiation arm in a form of an inductance coil and are parallel to each other.

8. The dual-polarized radiation unit according to claim 7, wherein winding directions of the first track and the second track are the same.

9. The dual-polarized radiation unit according to claim 1, further comprising:

a shunt filter, configured as a metallic wire extending inwardly from an edge of the hollow region.

10. The dual-polarized radiation unit according to claim 9, wherein the shunt filter is configured as an open circuit line.

11. The dual-polarized radiation unit according to claim 1, further comprising:

an inductance part extending from an edge of the hollow region towards the center portion of the dual-polarized radiation unit.

12. The dual-polarized radiation unit according to claim 1, wherein the radiation arms of the four dipoles are planar and symmetrical about the two mutually perpendicular lines.

13. An antenna, comprising:

at least one dual-polarized radiation unit; and a radiation element matching circuit, wherein: one of the at least one dual-polarized radiation unit comprises:

four dipoles, wherein radiation arms of the four dipoles are configured in relation to two mutually perpendicular lines; the two mutually perpendicular lines divide the radiation unit into four regions;

four grooves, respectively configured at an adjoining portion of two adjacent regions of the four regions; and four feed lines, wherein the four feed lines respectively correspond to the four grooves, and a length of any one of the four feed lines corresponds to an impedance;

wherein:

a center portion of the dual-polarized radiation unit where the four regions intersect with the two mutually perpendicular lines is direct current (DC) conductive;

each of the four regions has a hollow region;

each of the four feed lines initiates from a middle region of the dual-polarized radiation unit and extends to a feed point of the groove associated therewith; and each of the four feed lines are separately disposed in an associated region of the four regions and are non-intersecting with each other.

14. An antenna system, comprising:

at least one first antenna; and at least one second antenna, wherein a working frequency band of the at least one second antenna is higher than a working frequency band of the at least one first antenna, wherein:

each of the at least one first antenna comprises at least one dual-polarized radiation unit and a radiation element matching circuit;

one of the at least one dual-polarized radiation unit comprises:

four dipoles, wherein radiation arms of the four dipoles are configured in relation to two mutually perpendicular lines; the two mutually perpendicular lines divide the radiation unit into four regions;

four grooves, respectively configured at an adjoining portion of two adjacent regions of the four regions; and four feed lines, wherein the four feed lines respectively correspond to the four grooves, and a length of any one of the four feed lines corresponds to an impedance;

wherein:

a center portion of the dual-polarized radiation unit where the four regions intersect with the two mutually perpendicular lines is direct current (DC) conductive;

each of the four regions has a hollow region;

each of the four feed lines initiates from a middle region of the dual-polarized radiation unit and extends to a feed point of the groove associated therewith; and each of the four feed lines are separately disposed in an associated region of the four regions and are non-intersecting with each other.

15. The antenna system according to claim 14, wherein one of the at least one first antenna and one of the at least one second antenna partially overlap with each other.

16. The antenna system according to claim 15, wherein:

the antenna system comprises a plurality of the first antennas and a plurality of the second antennas;

the first antennas are arranged in one or more columns, and the second antennas are arranged in one or more columns; and a number of columns of the first antennas is same as a number of columns of the second antennas.

17. The antenna system according to claim 15, wherein:

the antenna system comprises a plurality of the first antennas and a plurality of the second antennas;

the first antennas are arranged in one or more columns, and the second antennas are arranged in one or more columns; and a number of columns of the second antennas is twice of the number of columns of the first antennas.

* * * * *